United States Patent [19]

Gergen et al.

[11] Patent Number: 4,904,744
[45] Date of Patent: Feb. 27, 1990

[54] POLYMER BLENDS OF CARBON MONOXIDE/OLEFIN COPOLYMER AND POLY(ARYLSULFONE) POLYMER AND OLIGOMER

[75] Inventors: William P. Gergen, Houston, Tex.; Robert G. Lutz, Santa Rosa, Calif.

[73] Assignee: Shell Oil Company, Houston, Tex.

[21] Appl. No.: 359,297

[22] Filed: May 31, 1989

Related U.S. Application Data

[63] Continuation-in-part of Ser. No. 203,958, Jun. 8, 1988, Pat. No. 4,839,435.

[51] Int. Cl.$^4$ ............................................. C08G 67/02
[52] U.S. Cl. ..................................... 525/391; 524/171; 525/534; 525/535; 525/539; 528/392
[58] Field of Search ................ 528/392; 525/391, 534, 525/535, 539; 524/171

[56] References Cited

U.S. PATENT DOCUMENTS 3,694,412  9/1972  Nozaki ................................. 528/392

FOREIGN PATENT DOCUMENTS 121965  10/1984  European Pat. Off. .
181014   5/1986  European Pat. Off. .
222454   5/1987  European Pat. Off. .
257663   3/1988  European Pat. Off. .

*Primary Examiner*—Harold D. Anderson
*Assistant Examiner*—T. Mosley
*Attorney, Agent, or Firm*—Dean F. Vance

[57] ABSTRACT

Blends of a major proportion of a linear alternating polymer of carbon monoxide and at least one ethylenically unsaturated hydrocarbon and lesser proportions of a relatively high molecular weight poly(arylsulfone) polymer and a relatively low molecular weight poly(arylsulfone) oligomer demonstrate improved processability and improved tensile modulus and tensile strength.

11 Claims, No Drawings

POLYMER BLENDS OF CARBON MONOXIDE/OLEFIN COPOLYMER AND POLY(ARYLSULFONE) POLYMER AND OLIGOMER

This application is a continuation-in-part of copending U.S. patent application Serial No. 203,958 filed June 8, 1988 now U.S. Patent No. 4,839,435.

FIELD OF THE INVENTION

This invention relates to improved blends comprising a linear alternating polymer of carbon monoxide and at least one ethylenically unsaturated hydrocarbon and other polymeric material. More particularly, the invention relates to ternary blends of the linear alternating polymer, a relatively high molecular weight poly(arylsulfone) polymer and a relatively low molecular weight poly(arylsulfone) oligomer.

BACKGROUND OF THE INVENTION

The class of polymers of carbon monoxide and olefin(s) has been known for a number of years. Brubacker, U.S. 2,495,286, produced such polymers of relatively low carbon monoxide content in the presence of free radical initiators, e.g., peroxy compounds. U.K. 1,081,304 produced similar polymers of higher carbon monoxide content in the presence of alkylphosphine complexes of palladium salts as catalyst. Nozaki extended the reaction to produce linear alternating polymers through the use of arylphosphine complexes of palladium moieties and certain inert solvents. See, for example, U.S. 3,694,412.

More recently, the class of linear alternating polymers of carbon monoxide and at least one ethylenically unsaturated hydrocarbon has become of greater interest in part because of the greater availability of the polymers. Such polymers, for example copolymers of carbon monoxide and ethylene or terpolymers of carbon monoxide, ethylene and propylene, are often referred to as polyketones or polyketone polymers and have been shown to be of the repeating formula $-CO-(A)-$ where A is the moiety of unsaturated hydrocarbon polymerized through the ethylenic unsaturation. By way of illustration, when the unsaturated hydrocarbon is ethylene, the polymers are represented by the repeating formula $-CO-(CH_2-CH_2)-$. The general process for the production of such polymers is illustrated by a number of published European Patent Applications including 121,965, 181,014, 222,454 and 257,663. The process generally involves the use of a catalyst composition formed from a compound of palladium, cobalt or nickel, the anion of a non-hydrohalogenic acid having a pKa below 2 and a bidentate ligand of phosphorus, arsenic or antimony.

The resulting polyketone polymers are relatively high molecular weight thermoplastics having established utility in the production by conventional procedures of shaped articles such as containers for food and drink and shaped parts for the automotive industry. For some particular applications, it has been shown to be desirable to have properties of a polymeric composition which are somewhat different from those of the polyketone polymer. It would be of advantage to retain the desirable properties of the polyketone polymer and yet retain the desirable properties of the polyketone polymer and yet retain other properties. These advantages are often obtained through the provision of a polymer blend.

SUMMARY OF THE INVENTION

This invention relates to blends of linear alternating polymers of carbon monoxide and at least one ethylenically unsaturated hydrocarbon with other polymeric material. More particularly, there is provided, according to the invention, ternary blends of the linear alternating polymer, relatively high molecular weight poly(arylsulfone) polymer and relatively low molecular weight poly(arylsulfone) oligomer. Such blends demonstrate improved tensile modulus and tensile strength as well as an improved processability.

DESCRIPTION OF THE INVENTION

The polyketone polymers which are employed as the major component in the blends of the invention are linear alternating polymers of carbon monoxide and at least one ethylenically unsaturated hydrocarbon. Suitable ethylenically unsaturated hydrocarbons for use as precursors of the polyketone polymers have up to 20 carbon atoms inclusive, preferably up to 10 carbon atoms inclusive, and are aliphatic such as ethylene and other $\alpha$-olefins including propylene, 1-butene, isobutylene, 1-oretene and 1-dodecene, or are arylaliphatic having an aryl substituent or an otherwise aliphatic molecule, particularly an aryl substituent on a carbon atom of the ehtylenic unsaturation. Illustrative of this latter class of ethylenically unsaturated hydrocarbons are styrene, p-methylstyrene, p-ethylstyrene and m-methylstyrene. Preferred polykeone polymers are copolymers of carbon monoxide and ethylene or terpolymers of carbon monoxide, ethylene and a second hydrocarbon of at least 3 carbon atoms, particularly an $\alpha$-olefin such as propylene.

The structure of the polyketone polymer is that of a linear alternating polymer of carbon monoxide and at least one ethylenically unsaturated hydrocarbon and the polymer will contain substantially one molecule of carbon monoxide for each molecule of hydrocarbon. When terpolymers of carbon monoxide, ethylene and a second hydrocarbon are employed in the blends of the invention, there will be, within the polyketone polymer, at least about 2 units incorporating a moiety of ethylene for each unit incorporating a moiety of the second hydrocarbon. Preferably, there will be from about 10 units to about 100 units incorporating a moiety of ethylene for each unit incorporating a moiety of the second hydrocarbon. The polymer chain is therefore represented by the repeating formula

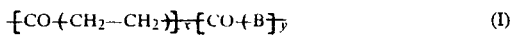  (I)

where B is the moiety obtained by polymerization of the second hydrocarbon through the ethylenic unsaturation. The $-CO-(CH_2-CH_2)-$ units and the $-CO-(B)-$ units are found randomly throughout the polymer chain and the ratio of y:x is no more than about 0.5. In the modification of the invention where copolymer of carbon monoxide and ethylene is employed, the second hydrocarbon is not present in the polymer chain and the copolymer is represented by the above formula (I) wherein y is 0. When y is other than 0, i.e., a terpolymer is employed, ratios of y:x from about 0.01 to about 0.1 are preferred. The end groups or "caps" of the polymer chain will depend upon what materials are present during the production of the polymer and whether and how the polymer has been purified. The precise nature of the end groups is of little significance so far as the overall properties of the polymer are concerned, however, and the polyketone polymer is fairly represented by the above formula (I). Of particular interest are the polymers of the above formula (I) of number average molecular weight from about 1000 to about 200,000, more particularly those of a number average molecular weight from about 20,000 to about 90,000, as determined by gel permeation chromatography (GPC), containing substantially equimolar amounts of carbon monoxide and unsaturated hydrocarbon. The physical properties of such polyketone polymers will depend in part on the molecular weight of the polymer, whether the polymer is a copolymer or a terpolymer and the relative proportion of the second hydrocarbon in the case of terpolymers. Typical melting points of such polymers are from about 175° C. to about 300° C., more often from about 210° C. to about 270° C.

A method of producing the polyketone polymers which is now becoming conventional is to contact the carbon monoxide and hydrocarbon(s) with a catalyst composition formed from a palladium compound, an anion of a non-hydrohalogenic acid having a pKa below about 6, preferably below 2, and a bidentate ligand of phosphorous. Such a process for polyketone production is illustrated by the above published European Patent Applications. The scope of the polymerization is extensive, but without wishing to be limited, a preferred palladium compound is a palladium alkanoate, particularly palladium acetate, a preferred anion is the anion of trifluoroacetic acid or p-toluenesulfonic acid and the preferred bidentate phosphorus ligand is 1,3-bis(diphenylphosphion)propane or 1,3-bis[di(2-methoxyphenyl)phosphino]propane.

Polymerization is conducted under polymerization conditions in the gaseous phase or in a liquid phase in the presence of a reaction diluent, e.g., a lower alkanol such as methanol or ethanol. The reactants are contacted by conventional methods such as shaking or stirring. Suitable reaction tempratures are from about 20° C. to about 150° C. with preferred temperatures being from about 50° C. to about 135° C. Typical reaction pressures are from about 1 bar to about 200 bar, more typically from about 10 bar to about 100 bar. Subsequent to reaction the polymer product is recovered as by filtration or decantation. The polyketone polymer may contain residues of the catalyst composition which are removed, if desired, by treatment of the polymer product with a solvent or a complexing agent which is selective for the residues.

The second component of the ternary blends of the invention is a relatively high molecular weight poly(arylsulfone) polymer. By the term "relativley high-molecular weight" poly(arylsulfone) polymer is meant a polymer having a molecular weight of at least about 20,000 and preferably at least about 40,000. The poly(arylsulfone) polymer is a polymer in which the repeating unit is a polyaryl sulfone moiety in which the aryl portion comprises at least two arylene, particularly phenylene, rings which are directly connected or are joined by an oxygen, sulfur or alkylidine connecting group or mixtures of such connected ring systems. The class of such poly(arylsulfone) polymers is conventional and well known in the art and is represented by the repeating formula

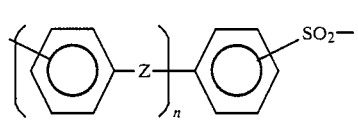

wherein Z independently is a direct carbon-carbon bond between the indicatedd phenylene rings, oxygen, sulfur or

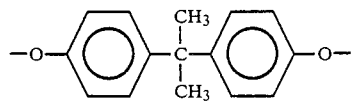

and n is 1 or 2. While the relative substitution on the phenylene rings of the above formula (II) is suitablyortho, meta, para or mixtures thereof, the preferred poly(arylsulfone) polymers contain phenylene moieties wherein the connecting groups are entirely para to the other connecting group on the same phenylene ring. Such preferred poly(arylsulfone) polymers are represented by the following repeating formulas which are embodiments of the above formula (II) of differing Z connecting groups.

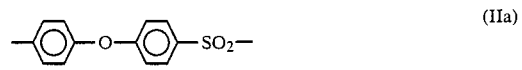

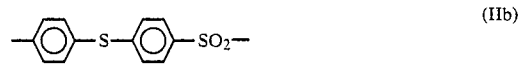

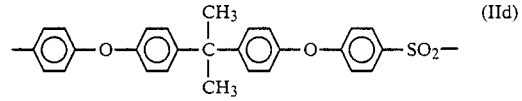

or mixtures thereof.

These poly(arylsulfone) polymers are well known in the art. Methods for preparing such poly(arylsulfone) polymers are disclosed in the references cited in the first column of U.S. 3,729,527. At sufficiently high molecular weight, the poly(arylsulfones) are engineering thermoplastics with high melting points and glass transition temperatures. Several of the types of poly(arylsulfone) polymers are commercially available. Poly(ether sulfones), i.e., the polysulfones of the above type (IIa) are available from ICI United States, Inc., as Grade 200P and Grade 300P. The polymers of the above type (IId) are available from Amoco as UDEL ® Polysulfone Resin. While the scope of the poly(arylsulfone) polymers which are suitably employed in the blends of the invention is extensive, the preferred poly(arylsulfone) polymers are those of the above types (IIa) and (IId), particularly the poly(ether sulfones) of types (IId).

The third component of the blends of the invention is a relatively low molecular weight poly(arylsulfone) polymer, also referred to as an oligomer. By relatively low molecular weight oligomer is meant an oligomer having a molecular weight of less than about 20,000, preferably less than about 10,000. The repeating unit of the poly(arylsulfone) oligomer is a polyaryl sulfone moiety in which the aryl portion comprises at least two arylene, particularly phenylene, rings which are directly connected or are joined by an oxygen, sulfur or alkylidine connecting group or mixtures of such connected ring systems. These poly(arylsulfone) oligomers are broadly known in the art and are represented by the formula

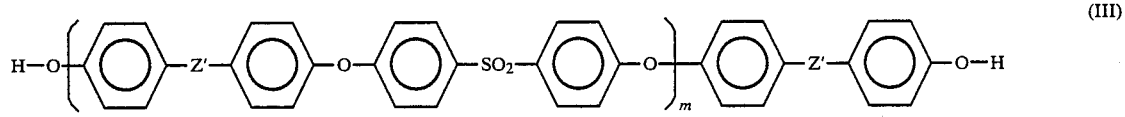

(III)

wherein Z' independently is a direct carbon-carbon bond between the indicated phenylene rings, oxygen, sulfur or 2,2-propylidine, and m is an integer of from about 3 to about 20 inclusive. While the relative substitution on the phenylene rings is suitably ortho, meta or para, the preferred poly(arylsulfone) oligomers contain phenylene groups wherein the connecting groups are entirely para to the other group on the same phenylene ring. The preferred poly(arylsulfone) oligomers are those of the above formula (III) wherein each Z' is 2,2-propylidine, i.e., those oligomers of the formula

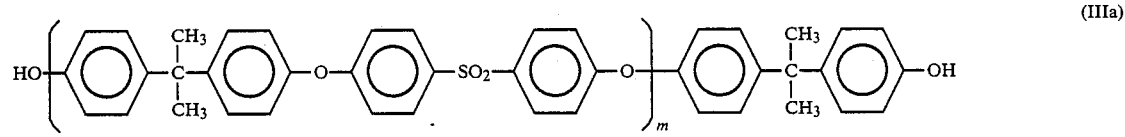

(IIIa)

wherein m has the previously stated meaning. Such a poly(arylsulfone) oligomer is a known material having a number average molecular weight of about 2100 and a glass transition temperature of about 145° C.

Numerous methods for the production of the oligomers of the above formula (III) are known but perhaps the most common is to react an alkali metal salt of the appropriate bisphenol with a di(chlorophenyl)sulfone provided in a reactant ratio selected so that the bisphenolsalt is present in molar excess, preferably in a substantial molar excess. By way of specific example, the disodium salt of 2,2-di(4-hydroxyphenyl)propane, present in molar excess, reacts with di(4-chlorophenyl)sulfone to produce the oligomer of formula (IIIa). Other methods for the production of the oligomers of formula (III) are known in the art.

The blends of the invention are ternary blends comprising a major proportion of the polyketone polymer with lesser proportions of the poly(arylsulfone) polymer and the poly(arylsulfone) oligomer. The polyketone is present in an amount of at least 65% by weight, based on total blend, and preferably in an amount of at least 80% by weight on the same basis. The poly(arylsulfone) polymer and the poly(arylsulfone) oligomer are each present in an amount of from about 0.5% by weight to about 20% by weight, based on total blend, with amounts of from about 5% by weight to about 15% by weight on the same basis being preferred. The relative proportions of the poly(arylsulfone) polymer and the poly(arylsulfone) oligomer are not critical, but each is preferably present in a quantity of from about 5% by weight to about 95% by weight of the poly(arylsulfone) portion, i.e., the portion other than that of the polyketone polymer of the blend.

The method of producing the blends of the polyketone polymer, the poly(arylsulfone) polymer and the poly(arylsulfone) oligomer is not material so long as an intimate mixture of the three components is obtained without undue degradation of the components or of the resulting blend. Because of the rather high melting points of the polyketone polymer and the poly(arylsulfone) polymer, blending at an elevated temperature is usually required. A particuarly useful procedure is to mix the components in the form of granules and/or powder in a high shear mixer. Intimate mixing is typically achieved by employing high shear extrusion compounding machines such as twin screw compounding extruders and thermoplastic extruders. "Intimately mixing" means to mix the components with sufficient mechanical shear and thermal energy to insure that the components will not delaminate on processing.

The blends of the invention are non-miscible blends having properties improved over the polyketone polymer. The poly(arylsulfone) polymer and the poly(arylsulfone) oligomer are at least partially and usually completely miscible with each other but exist as a discrete phase within the polyketone polymer matrix. The blends are not, of course, homogeneous but good blends are obtained when the poly(arylsulfone) polymer and the poly(arylsulfone) oligomer are uniformly distributed through the polyketone matrix.

The ternary blends of the invention may also include conventional additives such as antioxidants and stabilizers, fillers and fire resistant materials, mold release agents, pigments and other materials which are designed to increase the processability of the polyketone polymer or improve the properties of the resulting blend. Such additives are added by conventional methods prior to, together with or subsequent to the blending of the polyketone polymer and the poly(arylsulfone) polymer and the poly(arylsulfone) oligomer, which are typically blended in a single operation but alternatively may be blended in sequence.

The ternary blends of the invention demonstrate improved processability, in that a reduced pressure will be sufficient to cause the extrusion of a blend of the invention as compared with the unblended polyketone polymer, or alternativley the blend is processed at a higher speed by an extruder operating at a constant force. The blends show an improved tensile modulus and tensile strength and are of particular utility in instances where molded parts are desired which require strength. The blends are processed by the usual techniques such as extrusion and injection molding into, among other things, sheets, films, plates and molded objects. Illustrative of applications for the blends of the invention are in the production of both internal and external parts for the automotive industry and structural parts for application in the construction industry.

The invention is further illustrated by the following Illustrative Embodiments which should not be construed as limiting the invention.

ILLUSTRATIVE EMBODIMENT I

A linear alternating terpolymer of carbon monoxide, ethylene and propylene was produced in the presence of a catalyst composition formed from palladium acetate, p-toluenesulfonic acid and bis-di(2-methoxyphenyl)phosphino propane. the terpolymer had a melting point of 220° C. and an LVN, as measured at 60° C. in m-cresol, of 1.8 dl/g.

ILLUSTRATIVE EMBODIMENT II

A poly(arylsulfone) oligomer was produced by contacting the sodium salt of 2,2-di(4-hydroxyphenyl)propane and di(4-chlorophenyl)sulfone. In a 1 liter flask equipped with a nitrogen inlet, mechanical stirrer, dropping funnel and a Vigrean column, 2,2-di(4-hydroxyphenyl)propane (142.7 g, 0.625 mol), 500 ml of dimethyl sulfoxide, 100 ml of toluene and potassium hydroxide (70.13 g, 1.25 mol) in 70 ml of water were added. The flask and contents were heated to 130°–140° C. to remove water by azeotropic distillation. When the rate of distillation slowed, the temperature was reduced to below 100° C., 50 ml of toluene was added and the distillation resumed. This procedure was repeated 3 times and the temperature of the mixture was raised to 150°–155° C. for 1 hour. Heating was discontinued and when the temperature of the mixture fell to 40°–50° C., di(4-chlorophenyl) sulfone (143.55 G, 0.5 mole) was added. The reaction temperature was raised rapidly to 145° C. and maintained for 6 hours, then raised to 165° C. and maintained for 0.5 hr. After cooling to room temperature, the product mixture was poured slowly into 2 liters of water containing 80 g of oxalic acid. The oligomer was kept in the acid solution for 10 hours and then filtered and washed with distilled water. The oligomer product (24.5 g, 98% yield) melted at 145°–160° C. and was an off-white powder containing no chlorine.

ILLUSTRATIVE EMBODIMENT III

The following Illustrative Embodiment is based on theoretical considerations. A desired blend would likely comprise 80% weight of the polyketone terpolymer of Illustrative Embodiment I and 20% weight of poly(arylsulfone) which could be a blend of 70% weight high-molecular weight (40,000) polyarylsulfone and 30% weight arylsulfone oligomer from Illustrative Embodiment II. The mixture would likely be easily extruded at normal rates at 280° C. while mixtures of high molecular weight polyarylsulfone and only polymeric polyketone would not be as easily extruded at this temperature.

| | Estimated Viscosity Data @280° C. | | |
|---|---|---|---|
| Polyketone | Polymeric Arylsulfone | Oligomer | Complex Viscosity 1 rad/sec pa-sec |
| 100 | — | — | 840 |
| 80 | 20 | — | 4000 |
| 80 | 15 | 5 | 1800 |

What I claimed is:

1. Composition comprising a non-miscible ternary blend of a linear alternating polymer of carbon monoxide and at least one ethylenically unsaturated hydrocarbon, a relativley high molecular weight poly(arylsulfone) polymer and a relativley low molecular weight poly(arylsulfone) oligomer.

2. The composition of claim 1 wherein the linear alternating polymer is represented by the formula

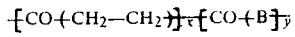

where B is the moiety of an ethylenically unsaturated hydrocarbon of at least 3 carbon atoms and the ratio of y:x is no more than about 0.5.

3. The composition of claim 2 wherein b is a moiety of propylene.

4. The composition of claim 3 wherein the poly(arylsulfone) polymer is represented by the repeating formula

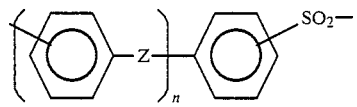

wherein Z independently represents a direct carbon-carbon bond or Z is oxygen, sulfur or

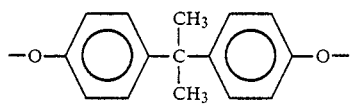

and n is 1 or 2.

5. The composition of claim 4 wherein the poly(arylsulfone) oligomer is represented by the formula

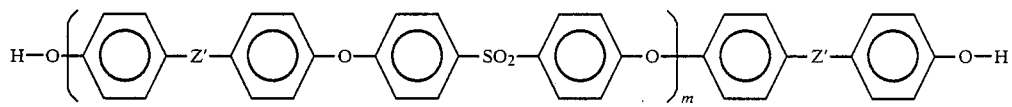

wherein Z' independently represents a direct carbon-carbon bond or Z is oxygen, sulfur or 2,2-propylidine, and m is a number of from about 3 to about 20 inclusive.

6. The composition of claim 1 wherein the linear alternating polymer is present in an amount of at least 65% by weight, based on total blend, and the poly(arylsulfone) polymer and the poly(arylsulfone) oligomer are each present in an amount of from about 0.5% by weight to about 20% by weight, based on total blend.

7. The composition of claim 6 wherein y is 0.

8. The composition of claim 6 wherein the ratio of y:x is from about 0.01 to about 0.1.

9. The composition of claim 8 wherein the poly(arylsulfone) polymer is represented by a repeating unit selected from

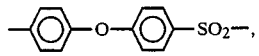
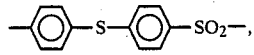
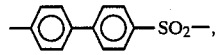
-continued
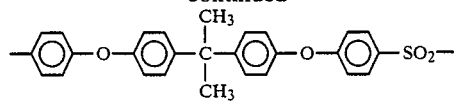
or mixtures thereof.
10. The composition of claim 9 wherein the poly(arylsulfone) polymer is represented by the formula
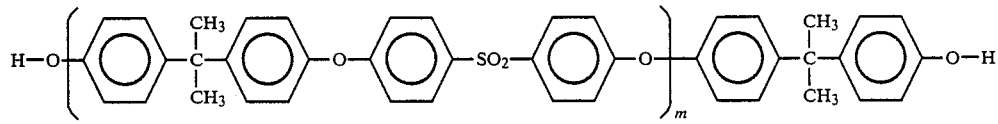
wherein m is a number from about 4 to about 6 inclusive.
11. The composition of claim 10 wherein the repeating formula for the poly(arylsulfone) polymer is
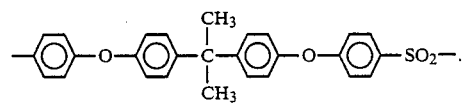
* * * * *